J. MUNN.
Portable Apparatus for Heating Roofing Material.
No. 56,783. Patented July 31, 1866.
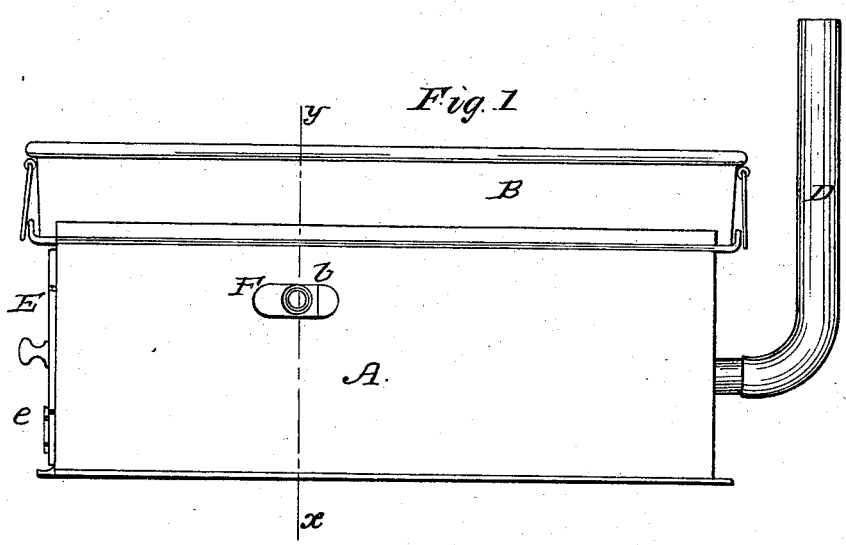
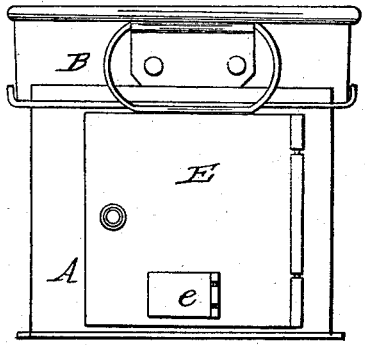
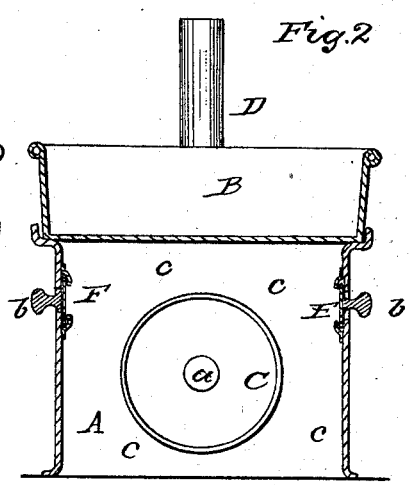

UNITED STATES PATENT OFFICE.

JOHN MUNN, OF COLUMBUS, NEW JERSEY.

PORTABLE APPARATUS FOR HEATING AND MELTING ROOFING MATERIAL.

Specification forming part of Letters Patent No. 56,783, dated July 31, 1866.

*To all whom it may concern:*

Be it known that I, JOHN MUNN, of Columbus, in the county of Burlington and State of New Jersey, have invented a new and useful apparatus for heating and melting asphaltum, bitumen, or such substances that are used for making mastic for the walls of houses and composition roofs by the application of hot air; and I do hereby declare the following to be a full, clear, and exact description of the construction and operation of the same, reference being had to the accompanying drawings, making a part of this specification, in which—

Figure 1 is a side elevation of my portable heating apparatus; Fig. 2, a transverse sectional view, as indicated by the line $x\,y$ in Fig. 1; Fig. 3, an end view.

Like letters in all figures of the drawings indicate like parts.

In the preparation of what is termed the "composition-roof material" for roofs, and mastic for the walls of houses, asphaltum, bitumen, or such substances that are used in making the same are put into an open flat oven elevated on stones or bricks in the street convenient to the building, and heated and melted by a wood fire built underneath. It has been found in many instances that the action of the flames on the oven containing the said material above named from a fire thus built generates too sudden and intense a heat, and consequently burns the same, more or less, which destroys its virtue, and thus impairs its effectiveness when mixed and applied with other material for the purposes herein mentioned.

The object and nature of my invention is to remedy this; and it consists in the application of hot air to the oven, without the intervention of flame, by means of a fire-box having an air-chamber formed therearound, with a suitable number of valves to regulate the degree of heated air.

To enable any one skilled in the art to make and use my invention, I will proceed to describe its construction and operation.

A represents a longitudinal box, the top edges of which are turned over in a suitable manner to form a resting-place to receive the pan or oven B, which corresponds in size and form to the box.

C is a cylindrical fire-box. It is placed within the other box above described, (see Fig. 2,) running its entire length, and secured to the ends of the same in a proper manner; D, the smoke-pipe. It is attached to the rear end of the fire-box, (seen clearly in Fig. 1,) the orifice or hole $a$ of which, communicating with the same, may be seen in Fig. 2.

At the front end of the fire-box is an ordinary door, E, with a suitable draft-door, $e$, attached to it. (See Figs. 1 and 3.)

On the sides of the box are sliding valves E E. (See Figs. 1 and 2.) They fit into strips of metal attached to the sides, and so formed above and below the openings as to admit of the valves sliding in an easy manner, and provided with knobs $b\,b$ to take hold of.

My heating apparatus may be made to deviate from the form of construction here described, and made of other forms, and arranged differently, and still embody the idea in the application of hot air for the purposes herein named.

The plan described I deem as the most preferable for the present. In the construction sheet metal of a suitable kind is used.

Operation: The asphaltum, bitumen, or other similar substances that may be used are placed in the pan. The air in the air-chamber $c$, formed by the outer box around the inner one, becoming heated to a sufficient degree, heats the pan, and thereby causes the material contained therein to be reduced in a gradual manner from a solid to a fluid state without causing the slightest injury thereto, as from the appliance of the method now in use and hereinbefore alluded to.

When it is desired to regulate the application of the hot air to the pan the sliding valves are opened to let in the cold air to the extent desired.

Having thus fully described my invention, what I claim therein as new, and desire to secure by Letters Patent, is—

1. The pan B and fire box or cylinder C, so arranged relatively to each other as to form an intervening air-chamber, $c$, between them, whereby the air is heated and applied to the pan, instead of a direct flame, as heretofore, substantially in the manner and for the purpose as herein set forth.

2. The sliding valves F F, in combination with the box A and air-chamber c, for regulating the degree of heat in its application to the pan by the admission of cold air, substantially in the manner as described.

3. The arrangement of the pipe D, the fire-box C, and pan B, substantially in the manner and for the purpose as described.

JOHN MUNN.

Witnesses:
EDWARD GRIEVES,
M. ELLIOTT BURRIS.